3,169,056
RECOVERY PROCESS
Ralph J. Bertolacini, Chesterton, Ind., assignor to Standard Oil Company, Chicago, Ill., a corporation of Indiana
No Drawing. Filed Mar. 15, 1960, Ser. No. 15,035
5 Claims. (Cl. 75—83)

This invention relates to a method for processing a composite comprising one or more noble metals and a refractory inorganic material.

Composites containing one or more noble metals admixed with a refractory inorganic material such as metal oxides or silicates are frequently used in the chemical and petroleum industries, e.g., the platinum supported on alumina catalysts now used extensively in catalytic reforming. In both research and commercial operations using these composites, it is frequently necessary to determine their hydrocarbon conversion activity, not only prior to their use but also after they have become partially or completely deactivated.

The noble metal portion of these composites is frequently small on the order of one weight percent. Hydrocarbon conversion activity, however, is not a direct function of the weight fraction of the composite which is a noble metal. Furthermore, the hydrocarbon conversion activity of a particular composite of specific noble metal content is not constant, but varies according to the conditions to which that composite has been subjected. Accordingly, it has been necessary heretofore to determine hydrocarbon conversion activity of a composite by conducting hydrocarbon conversion operations, either commercially or in a pilot plant under conditions simulating those of commercial operation. Even pilot plant operations conducted for this purpose are expensive and frequently too time consuming for research purposes or for process control.

Although the noble metal portion of the catalytic composites is small, the value thereof is sufficiently great to justify its extraction from a deactivated composite and, with particular reference to platinum-containing reforming catalysts, this is generally done. In commercial practice a noble metal is recovered by dissolving both the noble metal and its supporting carrier in a solvent. Inasmuch as both the noble metal and the supporting carrier are taken into solution, the dissolving procedure does not accomplish any increase in the concentration of the noble metal relative to the supporting carrier, nor any separation of the metal from a carrier. It is then necessary to recover the metal from a solution of which it constitutes a very small fraction.

A method has now been discovered for processing with acetylacetone a composite comprising a noble metal and a refractory inorganic material, whereby the metal in a form soluble in acetylacetone is separated from any of the metal in a form insoluble in acetylacetone. This method comprises contacting the composite with acetylacetone in the liquid phase for a time sufficient to dissolve therein any of the metal in the composite which exists in a form soluble in acetylacetone, and separating the resulting liquid phase from any remaining undissolved residue. The amount of the noble metal which dissolves in the acetylacetone, relative to the total amount of the metal in the composite, provides a measure of the hydrocarbon conversion activity of the composite.

In one embodiment of this invention, a composite comprising a refractory inorganic material soluble in acetylacetone is treated with a fluid reagent capable of converting the metal to a form substantially insoluble in the acetylacetone in an amount and for a time sufficient to convert substantially all of the metal to such a form. The composite is then contacted with acetylacetone in a quantity sufficient to dissolve substantially all of the refractory inorganic material in the acetylacetone. The resulting solution of the material in acetylacetone is separated from the undissolved residue which contains substantially all of the metal originally in the composite. The total amount of the noble metal in the composite may be determined by determining the amount of the metal in the residue.

This invention is applicable to the processing of noble metals admixed with refractory inorganic materials. The term "noble metals" includes palladium, platinum, iridium, gold, rhodium, ruthenium and osmium. Illustrative examples of refractory inorganic materials soluble in acetylacetone include oxides such as alumina, boria, chromia, gallia, magnesia, molybdena, silica, silicates, titania, zirconia and the like. Alumina dissolves readily in acetylacetone, while silica dissolves relatively slowly. The presence of any material insoluble in acetylacetone does not impede the determination of hydrocarbon activity of a composite by the method of this invention, because it is not necessary for that purpose that the materials with which the noble metal is admixed be soluble in acetylacetone.

This invention is particularly applicable to the determination of hydrocarbon conversion activity of platinum-supported alumina catalysts and the recovery of platinum therefrom. These catalytic composites may have been made by cogelling an alumina hydrosol, or by impregnating solid alumina, with a platinum compound such as a platinum-halogen acid or an amine, halide or sulfide of platinum. The catalyst may contain minor amounts of one or more halogens.

When separating a noble metal from a composite of which it is a constituent, the composite is treated with a fluid reagent capable of converting the noble metal to a form substantially insoluble in acetylacetone. This treating step is desirable in order to separate substantially all of the noble metal from the supporting material, inasmuch as it is known, with particular reference to platinum-alumina catalysts, that varying proportions of the noble metal may be present in a form which is soluble in acetylacetone. The selective solvent power of acetylacetone for different forms of noble metals is used in the hereinafter-described processing of composites for the determination of hydrocarbon conversion activity.

The reagent used to convert the noble metal to a form insoluble in acetylacetone may be either a gas or a liquid. Examples of suitable gases are hydrogen, carbon monoxide, sulfur dioxide and hydrogen sulfide; examples of suitable liquid reagents are formaldehyde, formic acid, hydroquinone and aqueous solutions of ammonium formate.

The concentration of the reagent may vary over wide limits depending upon the reagent used. It is preferable when using hydrogen that it be present in an amount from about 50 to 100 percent of the gas stream. A particularly suitable hydrogen-containing gas for purposes of this invention is a catalytic reforming hydrogen recycle gas which normally contains 75 to 85 percent hydrogen and 15 to 25 percent light hydrocarbons. When carbon monoxide, sulfur dioxide or hydrogen sulfide is used as the treating reagent, its concentration may range from about 2 percent on up to a substantially pure gas stream. A flue gas containing 2 to about 20 percent carbon monoxide is a particularly suitable treating reagent.

The concentration of the liquid treating reagents may also vary over a wide range. Formic acid may be used varying in concentration from a 5 percent aqueous solution to the 90 percent concentration sold commercially.

An aqueous solution containing from about 10 to about 50 weight percent ammonium formate is also suitable.

The amount of treating reagent to be used also varies depending upon the reagent. In theory, the minimum amount of reagent is that which will convert all the noble metal to the metallic state, or, in the case of sulfur-containing reagents, the corresponding sulfide. It has been found, however, that to assure complete conversion of the noble metal to a form which is insoluble in acetylacetone that from 2 to about 20 times the minimum theoretical amount should be used when working with liquid reagents and from 10 to 1,000 times the theoretical minimum, preferably 25 to 500 times and advantageously 50 to 250 times, when working with gaseous reagents. For treating a given composite, a greater excess is needed of a gaseous reagent than of a liquid reagent because of contacting problems.

The temperature at which the composite is treated also depends upon the treating reagent. When using gases, the treatment should be done at a temperature from about 700 to about 1350° F., preferably from about 900 to about 1300° F. Carbon monoxide, hydrogen sulfide and sulfur dioxide convert the noble metal to a form insoluble in acetylacetone faster at a given temperature than does hydrogen, and for this reason it is desirable to use a treating temperature of about 1100 to 1300° F. when using hydrogen, whereas a temperature of about 900 to 1000° F. gives a satisfactory rate of conversion with the other gases. When liquid treating reagents are used, the temperature may vary from about ambient to a temperature somewhat below the boiling point of the liquid, e.g., with a formic acid solution from about 50 to about 200° F., advantageously at a temperature between about 150° F. to 200° F.

The time during which the composite must be treated with the reagent varies from about 0.1 to about 24 hours. This depends in part on the reagent used, the temperature and the size of the composite particles. With liquid reagents the treating time need only be a few minutes to about an hour. With dilute carbon monoxide at a temperature of about 900 to 1,000° F., the treatment should last from about 0.5 to about 5 hours. A somewhat longer time is desirable when using hydrogen.

A wide range of pressures may be used, varying from atmospheric on upwards. Although pressures above atmospheric do not greatly increase the rate at which the platinum is converted to a form insoluble in acetylacetone when treating with liquid reagents, above atmospheric pressures are advantageous although not necessary when using gaseous reagents. For instance, a treatment with carbon monoxide containing flue gas or hydrogen recycle gas may be conducted at a pressure in the range normally used for catalytic reforming, e.g., from about 200 to about 800 p.s.i.g. Higher pressures are also suitable.

The size of the composite particles being treated affects the length of time necessary to convert all the noble metal to a form insoluble in acetylacetone. It is desirable that the particles have a maximum cross section not greater than about 1/8 to 1/4 of an inch. Preferably the particles are ground before treatment to pass through an ASTM No. 10 sieve, advantageously to pass through a No. 60 sieve (see ASTM specification E11–58T).

Inasmuch as the treatment may be done on particles up to a cross sectional diameter of 1/4 inch, it is sometimes desirable, in respect of catalytic composites, to conduct the treatment with a gas while the composite is in a reaction zone, such as a fixed or fluid bed refining unit. Use of carbon monoxide containing flue gas, or hydrogen recycle gas, with or without the addition of 2 to 5 percent hydrogen sulfide, is particularly suitable when treating a composite while it is still in a reaction zone. The treating step should be subsequent to an optional step of burning from the composite any carbonaceous deposits accumulated thereon during use.

After the noble metal has been converted to a form insoluble in acetylacetone, the refractory inorganic material is dissolved by contacting the composite with acetylactone. When used for contacting a composite in the method of this invention, the term "acetylacetone" means a liquid solvent comprising acetylacetone in either the keto form ($CH_3$—CO—$CH_2$CO—$CH_3$) or the eno form ($CH_3$—COH=CH—CO—$CH_3$). Generally both the keto and the eno forms of acetylacetone are present in the acetylacetone sold commercially. The acetylacetone solvent should preferably contain 50 weight percent or more of acetylacetone, and advantageously about 90–95 weight percent acetylacetone. Other constituents such as acetone, acetic acid, ethers and water may be present in the solvent without impairing its utility for this invention. About 2 to 20 parts of acetylacetone to 1 part of composite, wet basis, preferably 3 to 15 parts of acetylacetone, and advantageously 5 to 10 parts of acetylacetone, is used when contacting a composite in the determination of hydrocarbon activity or when separating a noble metal from the composite. The amount of acetylacetone used relative to the amount of composite refers to acetylacetone solvent containing about 90–95 weight percent acetylacetone. If the acetylacetone content of the solvent used is less, the amount of solvent used should be increased proportionally.

The contacting of the composite with acetylacetone may be done at atmospheric pressures as well as at higher pressures. The temperature is preferably maintained between ambient and the boiling point of acetylacetone, about 139° C. The contacting is advantageously done by refluxing at atmospheric pressure. The dissolving of the refractory inorganic material and any noble metal in a form soluble in acetylacetone proceeds rapidly even at room temperatures, and is normally completed in from between 1 minutes to about 1 hour. The time required for dissolution may be reduced by having first ground or crushed the composite before contacting it with acetylacetone, by agitation during the contacting step, and also by refluxing.

After the refractory inorganic material has been dissolved by contacting with acetylacetone, the resulting liquid phase, which contains acetylacetone and the refractory material, is separated from the remaining undissolved residue by means of decanting, filtering or centrifuging. The residue may optionally be washed with chloroform, low boiling aromatics, ketones, ethers or hydrocarbon acids. When a washed solvent is used on the residue, the solvent is preferably warmed to a temperature within 40° F. of its boiling point.

The residue contains substantially all of the noble metal originally in the composite. The noble metal in the residue is either in metallic form or, when hydrogen sulfide or sulfur dioxide has been used as treating reagents, as a sulfide. Possibly some of the noble metal is also present combined in a complex form which is readily destroyed by conventional methods of platinum refining. In some instances the noble metal will be sufficiently pure to be used without further refining. However, inasmuch as the purity specifications for platinum are generally stringent, it is usually advisable to further purify platinum in the residue such as by dissolving in aqua regia and subsequently separating therefrom a pure platinum compound. Alternatively the solution of platinum in aqua regia may be converted to aqueous chloroplatinic acid solution for use in catalyst manufacture.

When using the method of this invention for the purpose of determining the hydrocarbon conversion activity of a noble metal containing catalytic composite, a modification of the above-described procedure is used. The composite is contacted with acetylacetone without having been treated as a part of the process with a fluid reagent capable of converting the noble metal to a form substantially insoluble in acetylacetone. The composite is preferably although not mandatorily ground or crushed prior to contacting with acetylacetone in order to reduce the contacting time necessary to assure the substantially completed dissolution of any of the noble metal which is in a form soluble in acetylacetone. The contacting of the composite with acetylacetone is done as hereinabove described. The time of contacting may range from a few minutes to, preferably, several hours, and the contacting is preferably done by refluxing the acetylacetone solution, in order to assure complete dissolution of the acetylacetone-soluble form of noble metal.

After the contacting step is completed, the liquid phase is separated from the remaining residue. The residue is preferably washed one or more times with the above-described solvents. Different solvents may be used in succession if desired.

The hydrocarbon conversion activity of the composite is determined from the amount of the noble metal dissolved in the acetylacetone relative to the total amount of the noble metal originally in the composite. The amount of noble metal so dissolved may be determined directly by analysis of the liquid phase solution which was separated from the residue. It may also be determined by the difference between the amount of noble metal originally in the composite and the amount of the noble metal remaining in the residue. The amount of noble metal in the original composite or in the residue may be determined by conventional wet chemical analyses, or by spectrophotometric methods, such as the following method described with respect to platinum. Herein the starting material, either the composite or the above-described residue, is dissolved in aqua regia, following which the platinum is converted to chloroplatinic acid by repeated drying of the solution to wet salts and then dissolving in HCl. Formic acid is added to convert any nitrates to oxides of nitrogen, which are released as gases. A 20 percent solution of stannous chloride is then added to the chloroplatinic acid solution to develop the color necessary for platinum determination by spectrophotometric means.

The total amount of noble metal in the composite may also be determined by treating an aliquot of a composite with a fluid reducing reagent capable of converting all of the noble metal to a form substantially insoluble in acetylacetone, contacting with acetylacetone, separating the resulting liquid phase from the remaining residue, and determining the amount of noble metal in the residue, all as described hereinabove.

A noble metal-containing solution of acetylacetone, such as is derived when determining hydrocarbon conversion activity, may be used when preparing a new catalytic composite. This may be done by evaporating or decomposing the acetylacetone, converting the noble metal to a form suitable for addition to a catalyst-supporting material, and impregnating that material. It may also be done by separating the noble metal, as by precipitation as a sulfide, from the acetylacetone solution, converting the sulfide to a form suitable for addition to a fresh catalyst-supporting material, and then impregnating that material. In either situation the noble metal or its sulfide may be converted to a suitable form by treating with aqua regia in order to form a complex acid, such as chloroplatinic acid. A new composite may also be made by immersing a fresh supporting material which is relatively insoluble in acetylacetone, such as silica, in the noble metal-containing acetylacetone solution at room temperatures or below, followed by evaporation under vacuum of the acetylacetone and ultimately drying and calcining.

Examples

A series of tests was made to demonstrate this invention, using four platinum supported on alumina catalytic composites prepared as follows. Composites A, B and C were prepared by cogelling a sulfided chloroplatinic acid solution with a Heard-type alumina hydrosol, and drying and calcining. Composite D was prepared by gelling, drying and calcining a Heard-type alumina hydrosol, then impregnating the calcined alumina with an aqueous solution of chloroplatinic acid and aluminum chloride, and again drying and calcining. The platinum contents of Composites A, B, C and D were, respectively, 0.578, 0.594, 0.576 and 0.178, weight percentage. All the catalysts were in the form of ⅛″ x ⅛″ pellets.

In tests to determine the fractions of platinum which were soluble in acetylacetone, a sample weighing approximately 5 grams of the composite under consideration was ground to pass a 60 mesh ASTM sieve. The ground composite and about 50 milliliters of commercially available acetylacetone were placed in a glass reflux distillation column, and the acetylacetone was refluxed at atmospheric pressure for about one hour. The dissolving of the alumina support into the acetylacetone was generally complete in about five minutes or less.

The resulting liquid phase solution of alumina and acetylacetone, containing in these tests some platinum, was cooled to about room temperature and filtered through Whatman No. 42 filter paper to separate the liquid phase solution from any remaining solid residue. The residue remaining on the filter paper was then washed one to three times with 25 milliliter portions of chloroform heated to a temperature of between 100 and 140° F.

The platinum in the residue was determined by dissolving the residue in aqua regia, following which the platinum was converted to chloroplatinic acid by repeated drying of the solution to a wet salt and then dissolving in hydrochloric acid. Formic acid was added to convert any nitrates to oxides of nitrogen, which were released as gases. A 20 percent solution of stannous chloride was then added to the chloroplatinic acid to develop the color necessary for platinum determination by spectrophotometric methods.

The platinum content of the liquid phase was determined by difference between the platinum originally in the composite and the platinum in the residue, all being expressed as a weight percent of the original composite.

Aliquot samples of Composites A, B and D, in the form of ⅛″ x ⅛″ cylindrical pellets were tested in a bench scale reforming pilot plant having a 50 milliliter reactor. The feed was a Mid-Continent naphtha having an API gravity of about 55, boiling between about 175 and about 400° F., and containing about 50 percent paraffins, 40 percent naphthenes, and not more than 1 percent olefins, with the remainder being aromatics. The reforming conditions used were a block temperature of 930° F., a pressure of about 200 p.s.i.g., and a weight hourly space velocity of about 2. Hydrogen was mixed with the feed at a rate of about 5,000 s.c.f. per barrel of naphtha. From the resulting reformate product inspection tests and the reforming conditions used, the relative activities of the catalysts in question were calculated as the quantity, expressed as a percentage, of an arbitrarily chosen standard reference catalyst required to produce a $C_5+$ reformate fraction having the same octane number under the same test conditions.

The results of the above-described procedures are summarized in the following table:

| Composite | Platinum Soluble in Acetylacetone | | Relative Activity |
|---|---|---|---|
| | Wt. Percent of Catalyst | Wt. Percent of Total Platinum | |
| A | 0.286 | 50 | 100 |
| B | 0.202 | 34 | 91 |
| D | 0.178 | 100 | 178 |

These data demonstrate the relationship between the fraction of the total platinum in the composites which is soluble in acetylacetone, and the relative activity of the composites.

Using the above-described processing technique, 50 percent of the platinum in Composite C was found to be soluble in acetylacetone. About 400 grams of Composite C in a glass reactor was then treated at about 1300° F. by passing through the reactor about one liter per hour of hydrogen at atmospheric pressure for about 16 hours. An aliquot weighing about 1 gram of the thus treated catalyst was ground and refluxed for about six hours in 25 milliliters of acetylacetone. The solution was cooled to about room temperature and filtered in order to separate the resulting liquid phase solution of acetylacetone and alumina from the platinum-containing residue. The residue was washed at atmospheric pressure first with about 25 milliliters of benzene and then with about 25 milliliters of chloroform. The solvents were used at a temperature within 40° F. of their boiling points. The platinum in the residue was 0.574 weight percent, based on the composite treated, giving a platinum recovery of between 99 and 100 percent.

Having described the invention, what is claimed is:

1. A method for separating noble metal from a refractory inorganic material, which comprises contacting a composite, comprising a noble metal at least a portion of which is in a form which is insoluble in acetylacetone and a refractory inorganic material which is soluble in acetylacetone, with liquid acetylacetone in a quantity sufficient to dissolve substantially all of said material therein, and separating the resulting solution of said material in acetylacetone from the undissolved residue, said residue comprising a noble metal in a form insoluble in acetylacetone.

2. A method for recovering a noble metal from a composite comprising said metal and a refractory inorganic material, said material being soluble in acetylacetone, which method comprises treating at a temperature between about 700 and about 1350° F. said composite with gaseous hydrogen in an amount and for a time, in excess of about 1 hour, sufficient to convert substantially all of said metal to a form insoluble in acetylacetone, contacting said composite with liquid acetylacetone in a quantity sufficient whereby substantially all of said material is dissolved in said acetylacetone, separating the resulting solution of said material in said acetylacetone from the remaining undissolved residue, and recovering said metal from said residue.

3. A method for recovering a noble metal from a composite comprising said metal and a refractory inorganic material, said material being soluble in acetylacetone, which method comprises treating at a temperature between about 700 and about 1350° F. said composite with flue gas comprising at least about 2 volume percent carbon monoxide in an amount and for a time, in excess of about 1 hour, sufficient to convert substantially all of said metal to a form insoluble in acetylacetone, contacting said composite with liquid acetylacetone in a quantity sufficient whereby substantially all of said material is dissolved in said acetylacetone, separating the resulting solution of said material in said acetylacetone from the remaining undissolved residue, and recovering said metal from said residue.

4. A method for recovering a noble metal from a composite comprising said metal and a refractory inorganic material, said material being soluble in acetylacetone, which method comprises treating, at a temperature between about ambient and about 200° F. and at about atmospheric pressure, said composite with formic acid in the liquid phase in an amount and for a time sufficient to convert substantially all of said metal to a form insoluble in acetylacetone, contacting said composite with liquid acetylacetone in a quantity sufficient whereby substantially all of said material is dissolved in said acetylacetone, separating the resulting solution of said material in said acetylacetone from the remaining undissolved residue, and recovering said metal from said residue.

5. A method for separating platinum from alumina which comprises contacting a composite comprising platinum, at least a portion of which is in a form which is insoluble in acetylacetone, and alumina with liquid acetylacetone in a quantity sufficient to dissolve substantially all of said alumina and separating the resulting solution of alumina in acetylacetone from undissolved residue, said residue comprising platinum in a form insoluble in acetylacetone.

References Cited in the file of this patent
UNITED STATES PATENTS

| | | |
|---|---|---|
| 2,693,455 | Smith et al. | Nov. 2, 1954 |
| 2,863,762 | Pullen | Dec. 9, 1958 |
| 2,918,355 | Eckstrom | Dec. 22, 1959 |
| 2,928,792 | Bertolacini | Mar. 15, 1960 |
| 2,945,757 | Hoekstra | July 19, 1960 |
| 2,950,965 | Hoekstra | Aug. 30, 1960 |